United States Patent

Owada et al.

(10) Patent No.: US 9,316,374 B2
(45) Date of Patent: Apr. 19, 2016

(54) VEHICLE HEADLIGHT

(71) Applicant: Stanley Electric Co., Ltd., Tokyo (JP)

(72) Inventors: Ryotaro Owada, Tokyo (JP); Tatsuya Sekiguchi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 50 days.

(21) Appl. No.: 14/183,507

(22) Filed: Feb. 18, 2014

(65) Prior Publication Data

US 2014/0233253 A1 Aug. 21, 2014

(30) Foreign Application Priority Data

Feb. 15, 2013 (JP) .................................. 2013-028092

(51) Int. Cl.
*F21V 7/00* (2006.01)
*F21S 8/10* (2006.01)
*B60Q 1/04* (2006.01)
*G02B 3/04* (2006.01)

(52) U.S. Cl.
CPC ........... *F21S 48/125* (2013.01); *F21S 48/1266* (2013.01); *F21S 48/1382* (2013.01); *F21S 48/1388* (2013.01); *F21S 48/145* (2013.01); *B60Q 1/04* (2013.01); *G02B 3/04* (2013.01)

(58) Field of Classification Search
CPC .............. B60Q 1/04; G02B 3/02; G02B 3/04; G02B 2003/0093; F21S 48/125; F21S 48/1258; F21S 48/1266; F21S 48/1275; F21S 48/1291; F21S 48/13; F21S 48/1323
See application file for complete search history.

(56) References Cited

U.S. PATENT DOCUMENTS

| 4,851,968 | A * | 7/1989 | Nino | 362/539 |
| 7,367,703 | B2 * | 5/2008 | Yagi et al. | 362/539 |
| 7,784,984 | B2 * | 8/2010 | Ishida | 362/538 |
| 2003/0198060 | A1 | 10/2003 | Ishida et al. | |
| 2006/0215415 | A1 * | 9/2006 | Suzuki et al. | 362/539 |

FOREIGN PATENT DOCUMENTS

| EP | 1 357 332 A2 | 10/2003 |
| JP | 4080780 B2 | 4/2008 |
| JP | 2009-277368 A | 11/2009 |

* cited by examiner

*Primary Examiner* — Peggy Neils
*Assistant Examiner* — Alexander Garlen
(74) *Attorney, Agent, or Firm* — Kenealy Vaidya LLP

(57) ABSTRACT

A vehicle headlight utilizes a rotationally asymmetric projection lens with its light emitting surface inclined with respect to the optical axis thereof, whereby the light emitted from the light source and projected forward through the light emitting surface of the projection lens is diffused substantially uniformly with respect to the optical axis of the projection lens, for example, uniform substantially in the right and left directions and/or the upper and lower directions. This can be achieved by designing the reflecting surface to have its optical axis inclined with respect to the optical axis of the projection lens by a predetermined angle so that light emitted from the light source and projected forward through the light emitting surface of the projection lens is made uniform with respect to the optical axis of the projection lens (for example, uniform substantially in the right and left directions and/or the upper and lower directions).

8 Claims, 8 Drawing Sheets

VEHICLE HEADLIGHT

This application claims the priority benefit under 35 U.S.C. §119 of Japanese Patent Application No. 2013-028092 filed on Feb. 15, 2013, which is hereby incorporated in its entirety by reference.

TECHNICAL FIELD

The presently disclosed subject matter relates to vehicle headlights, and in particular, to a projector-type vehicle headlight.

BACKGROUND ART

Conventionally, various projector-type headlights have been proposed, such as those disclosed in Japanese Patent No. 4080780 (or U.S. Application Publication No. 2003/0198060A1 or EP1357332A2 corresponding thereto).

Figure 1A:
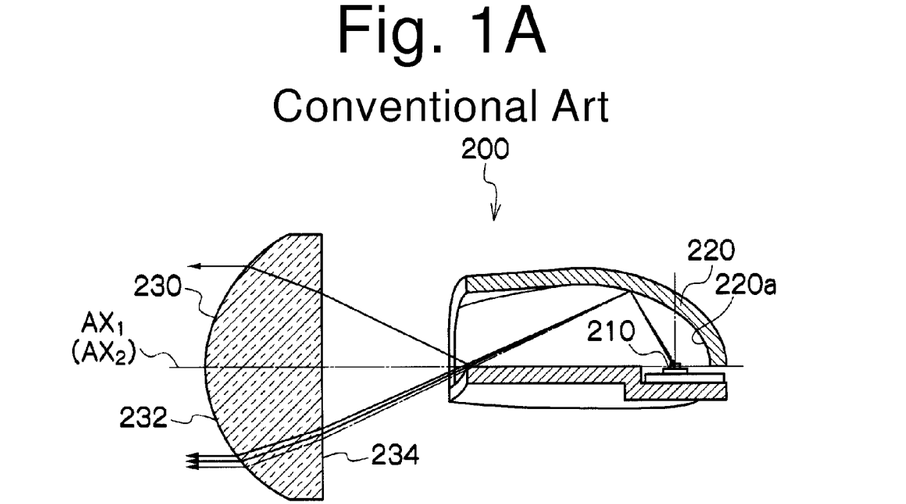
FIGS. 1A and 1B are a vertical cross-sectional view of a projector-type vehicle headlight described in the publication of Japanese Patent No. 4080780, and a top plan view thereof, respectively.
Figure 1B:
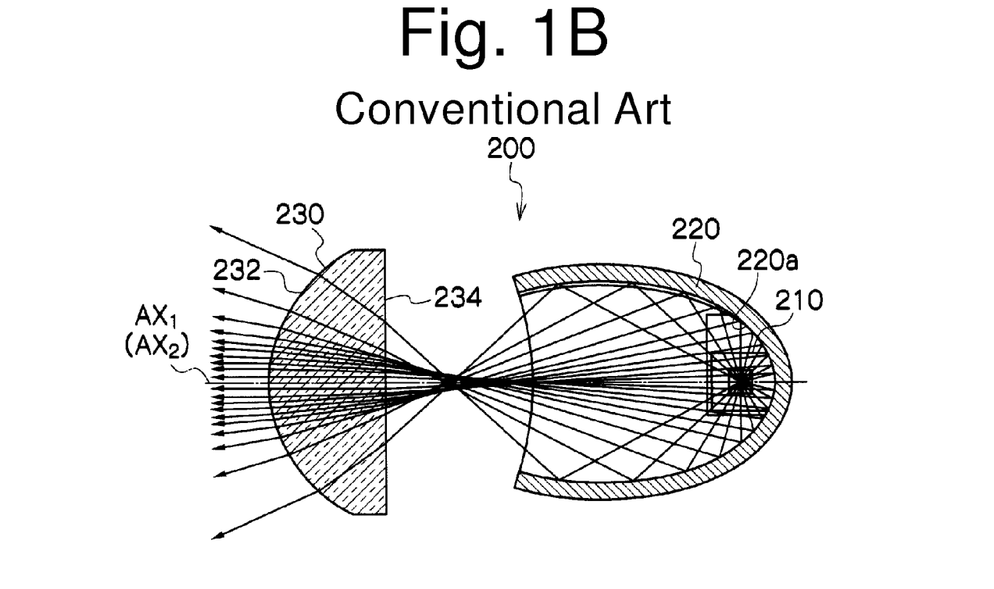

FIGS. 1A and 1B are a vertical cross-sectional view of a projector-type vehicle headlight 200 described in the above publication and a top plan view thereof, respectively.

As shown in FIG. 1A, the projector-type vehicle light 200 can include a projection lens 230 having an optical axis $AX_1$, a light source 210 disposed on the optical axis $AX_1$, and a reflector 220 having a reflecting surface 220a formed thereinside above the light source 210. Light emitted from the light source 210 can be reflected by the reflector 220 (reflecting surface 220a) forward to be gathered close to the optical axis $AX_1$, and the reflected light can be projected through the projection lens 230 disposed in front of the reflector 220, whereby the light can be projected forward of the vehicle headlight. Herein, the projection lens 230 can have a convex light emitting surface 232 and a plane light incident surface 234 so as to be configured as a plano-convex lens in a rotationally symmetric shape. (See FIGS. 1A and 1B.) Herein, the reflector 220 (reflecting surface 220a) can have an optical axis $AX_2$ that is coincident with the optical axis $AX_1$ of the projection lens 230.

With the projector-type vehicle headlight 200 with the above configuration, the light emitted from the light source 210 and projected forward through the projection lens 230 can be diffused uniformly in the right and left directions with respect to the optical axis $AX_1$ of the projection lens 230. (See FIG. 1B.)

In the projector-type vehicle headlight 200 with the above configuration, there is a demand to utilize a rotationally asymmetric projection lens for the projector-type vehicle headlight 200, having a light emitting surface (232) inclined with respect to the optical axis $AX_1$ of the projection lens (230) in a rotationally asymmetric manner. However, in this case, a problem would arise in which the light emitted from the light source 210 and projected forward through the projection lens (230) may be diffused locally in the right or left direction (and/or up or down direction) with respect to the optical axis $AX_1$ of the projection lens (230).

SUMMARY

The presently disclosed subject matter was devised in view of these and other problems and features in association with the conventional art. According to an aspect of the presently disclosed subject matter, a vehicle headlight can include a rotationally asymmetric projection lens whose light emitting surface is inclined with respect to the optical axis of the projection lens, wherein the light emitted from a light source and projected forward through the projection lens can be diffused uniformly with respect to the optical axis of the projection lens even with the use of such a rotationally asymmetric projection lens.

According to another aspect of the presently disclosed subject matter, a vehicle headlight can include: a reflector having a spheroidal reflecting surface with a first focus and a second focus; a rotationally asymmetric projection lens having a light emitting surface on a front side and a light incident surface on a rear side and a focus close to the light incident surface, the projection lens being disposed in front of the reflector with the focus disposed at or near (i.e., substantially at) the second focus; and a light source disposed at or near (i.e., substantially at) the first focus, the light source configured to emit light that is reflected by the reflecting surface, incident on the light incident surface to enter the projection lens, and projected through the light emitting surface of the projection lens. In this vehicle headlight, the projection lens can have an optical axis passing through the focus of the projection lens and extending in a front-to-rear direction of the vehicle headlight, and the light emitting surface of the projection lens can be configured to be a surface inclined with respect to the optical axis of the projection lens. In addition, the light incident surface can be configured to be a surface in which, when a plurality of light beams in parallel to the optical axis of the projection lens is incident on the light emitting surface to enter thereinside, the plurality of light beams exiting through the light incident surface can be focused at the focus of the projection lens. Furthermore, the reflecting surface can have an optical axis passing through the first focus and the second focus and be disposed such that the optical axis of the reflecting surface is inclined with respect to the optical axis of the projection lens by a predetermined angle so that the light emitted from the light source and projected forward through the light emitting surface of the projection lens is made uniform with respect to the optical axis of the projection lens.

According to the above vehicle headlight utilizing a rotationally asymmetric projection lens with its light emitting surface inclined with respect to the optical axis thereof, the light emitted from the light source and projected forward through the light emitting surface of the projection lens can be diffused substantially uniformly with respect to the optical axis of the projection lens (for example, uniform substantially in the right and left directions and/or the upper and lower directions). This can be achieved by designing the reflecting surface to have its optical axis (optical axis passing through the first and second focuses) that is inclined with respect to the optical axis of the projection lens by a predetermined angle so that the light emitted from the light source and projected forward through the light emitting surface of the projection lens is made uniform with respect to the optical axis of the projection lens (for example, uniform substantially in the right and left directions and/or the upper and lower directions).

The vehicle headlight with the above configuration can include a light-shielding member disposed between the projection lens and the light source, configured to shield part of light that is emitted from the light source and directed through the light emitting surface of the projection lens and upward.

With this configuration, the vehicle headlight can form an appropriate light distribution pattern including a cut-off line, such as a low-beam light distribution pattern.

According to another aspect of the presently disclosed subject matter, a vehicle headlight unit can include a plurality of the above vehicle headlights.

According to the vehicle headlight unit utilizing a plurality of vehicle headlights with the configuration described above, the advantageous effects of the vehicle headlights described above can also be exerted.

In the above vehicle headlight unit, if the plurality of vehicle headlights are provided separately, the vehicle headlight may be configured to include separate projection lenses or if the plurality of headlights are provided integrally, the vehicle headlight unit may have a single composite projection lens as the projection lenses of the plurality of vehicle headlights, and the composite projection lens can be formed from a single projection lens composed of the plurality of projection lenses each serving as the projection lens of the vehicle headlight.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below to vehicle headlights of the presently disclosed subject matter with reference to the accompanying drawings in accordance with exemplary embodiments. Note that the directions including the "right," "left," "front," "rear," "upper," and "lower" directions are based on the situation where the vehicle headlight is installed in a vehicle body.

Figure 2:
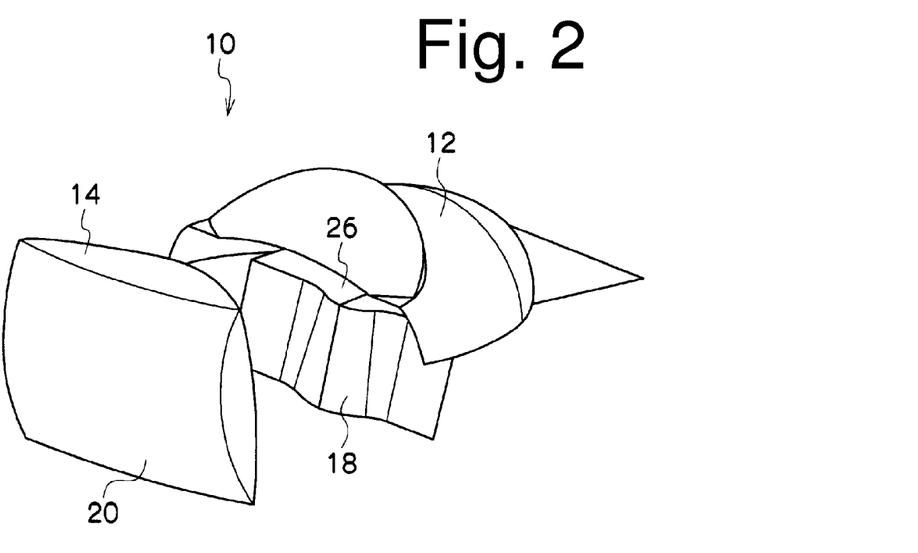
FIG. 2 is a perspective view of a vehicle headlight made in accordance with principles of the presently disclosed subject matter.
Figure 3:
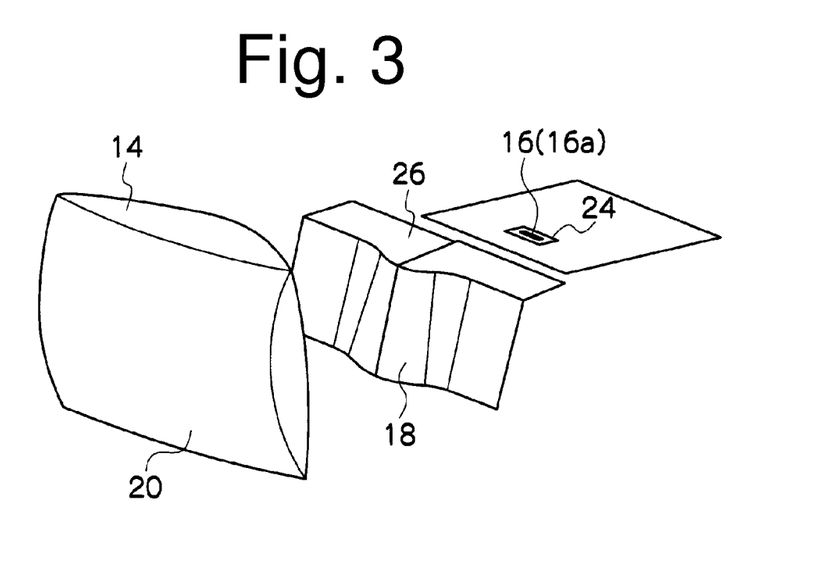
FIG. 3 is an exploded perspective view of the vehicle headlight of FIG. 2.
Figure 4:
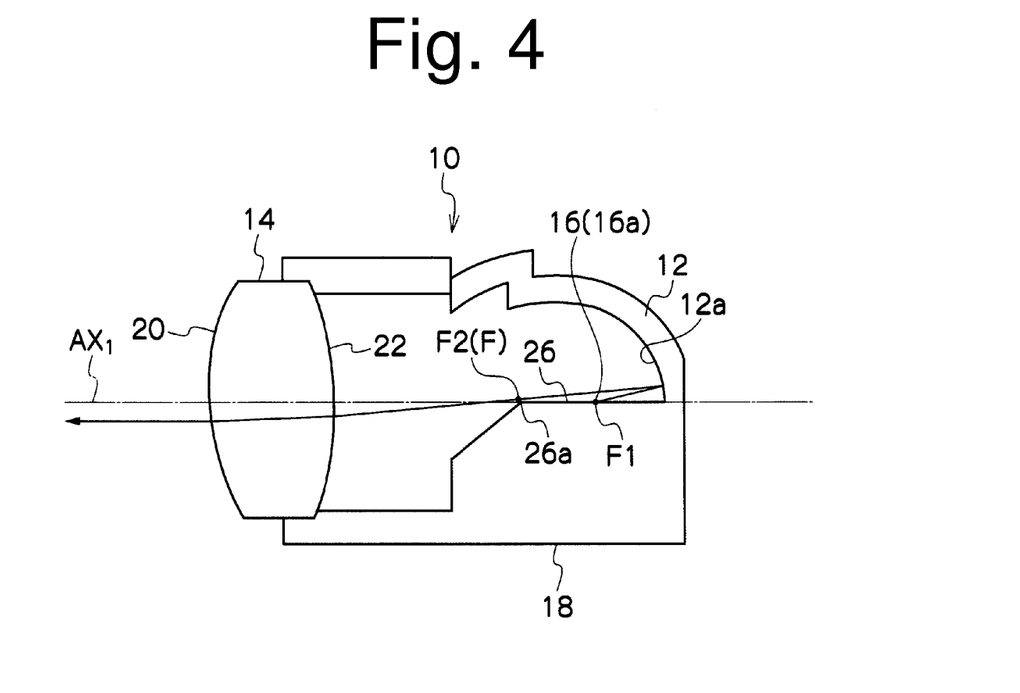
FIG. 4 is a vertical cross-sectional view of the vehicle headlight of FIG. 2.
Figure 5:
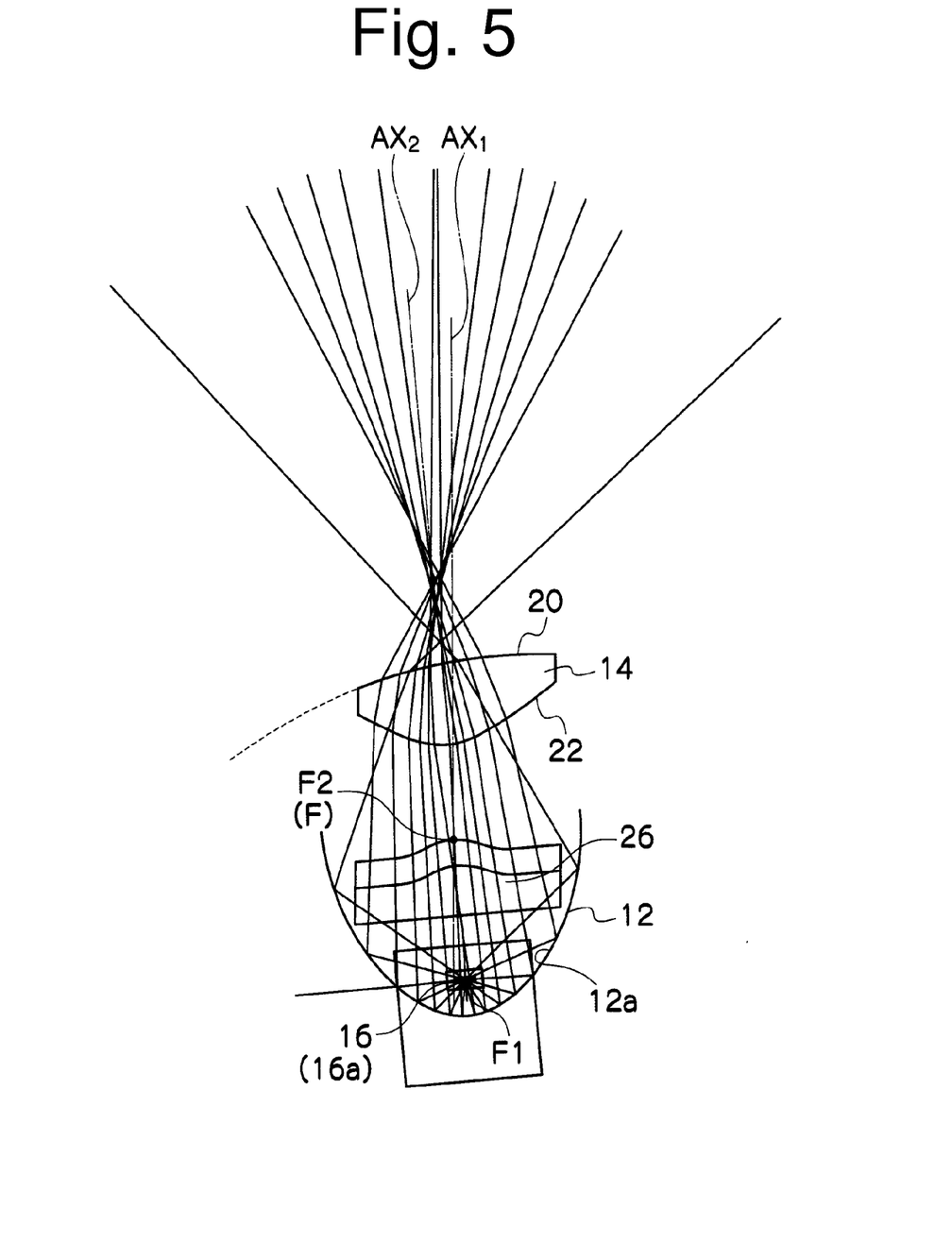
FIG. 5 is a top plan view of the vehicle headlight of FIG. 2, illustrating how the light beams are reflected by the reflector of which optical axis is inclined with respect to an optical axis of the projection lens.

FIG. 2 is a perspective view of a vehicle headlight 10 made in accordance with principles of the presently disclosed subject matter, FIG. 3 is an exploded perspective view of the vehicle headlight 10 of FIG. 2 (a reflector 12 is omitted herein), FIG. 4 is a vertical cross-sectional view of the vehicle headlight 10 of FIG. 2, and FIG. 5 is a top plan view of the vehicle headlight 10 of FIG. 2 when seeing through a reflector 12, illustrating how the light beams are reflected by the reflector 12 of which optical axis $AX_2$ is inclined with respect to an optical axis $AX_1$ of the projection lens 14.

The vehicle headlight 10 of the presently disclosed subject matter can be arranged on right and left sides of the front portion of a vehicle body.

In general, a vehicle headlight 10 arranged on the right side can have the same symmetric configuration as the vehicle headlight on the left side. Thus, a description hereinafter will be described mainly regarding the vehicle headlight 10 on the left side while that on the right side will not be described.

The vehicle headlight 10 can be a projector-type lighting unit configured to form a low-beam light distribution pattern, and as shown in FIGS. 1 to 4, can include a reflector 12 having a reflecting surface 12a and including an optical axis $AX_2$, a projection lens 14 having an optical axis $AX_1$, and a focus F, a light source 16, a holding member configured to support these components.

The reflecting surface 12a of the reflector 12 can be configured to reflect light emitted from the light source 16 forward near the optical axis $AX_1$ of the projection lens 14 to collect the light near the focus F of the projection lens 14. Specifically, the reflecting surface 12a can be a spheroidal reflecting surface (spheroidal surface or a free curved surface). The spheroidal reflecting surface can be configured to have an elliptical cross section including its optical axis $AX_2$ and a first focus F1 and a second focus F2, and its eccentricity can be designed to increase from its vertical cross section to its horizontal cross section. The reflector 12 can be secured to the holding member 18 at its lower peripheral edge.

The optical axis $AX_1$ of the projection lens 14 can extend through its focus F in the front-to-rear direction of a vehicle body. The optical axis $AX_2$ of the reflecting surface 12a can be allowed to pass through the first focus F1 and the second focus F2. The optical axis $AX_2$ of the reflecting surface 12a is different from that of a general projector-type vehicle headlight and is not coincident with the optical axis $AX_1$ of the projector lens 14, but can be configured to be inclined with respect to the optical axis $AX_1$ of the projector lens 14 by a predetermined angle (see FIG. 5). Note that in the present embodiment the optical axis $AX_1$ of the projector lens 14 can coincide with the optical axis of the vehicle headlight 10.

As shown in FIG. 3, the light emitted from the light source 16 and reflected by the reflecting surface 12a (as shown in the vertical cross section) can be collected to the second focus F2 (also the focus F of the projection lens 14) and allowed to pass through the projection lens 14 to be projected forward as light beams substantially parallel to the optical axis $AX_1$. On the other hand, as shown in FIG. 5, the light emitted from the light source 16 and reflected by the reflecting surface 12a (as shown in the horizontal cross section) can be allowed to pass through the projection lens 14 without being collected to the second focus F2 (also the focus F of the projection lens 14), so that the light beams can cross in front of the second focus F2 (also the focus F of the projection lens 14). In this manner, the light beams can be diffused in the horizontal direction to be projected forward.

Figure 6A:
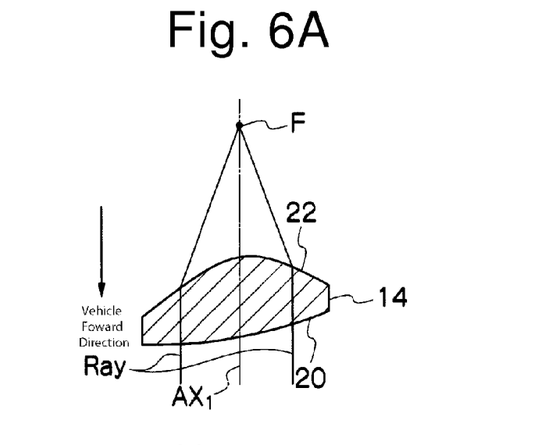
FIG. 6A is a cross-sectional view of the projection lens taken along A-A line of FIG. 6B.
Figures 6B, 6C:
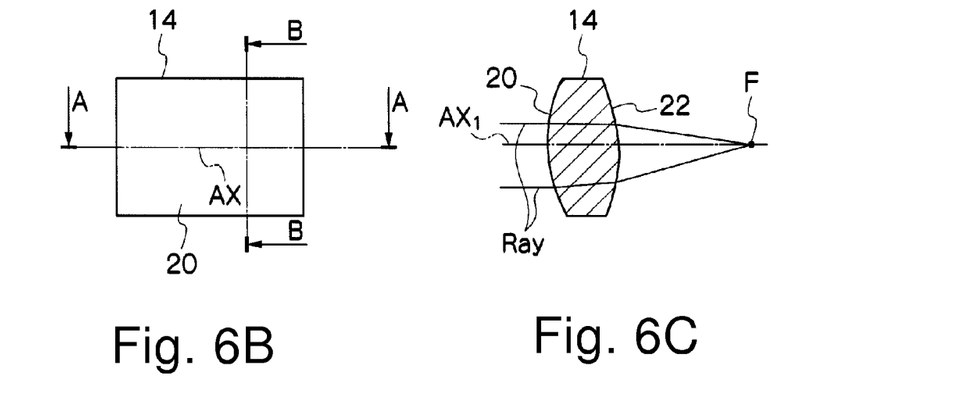
FIG. 6B is a front view of the projection lens.
FIG. 6C is a cross-sectional view of the projection lens taken along B-B line of FIG. 6B.

FIG. 6A is a cross-sectional view of the projection lens taken along A-A line of FIG. 6B, FIG. 6B is a front view of the projection lens, and FIG. 6C of a cross-sectional view of the projection lens taken along B-B line of FIG. 6B.

As shown in FIGS. 6A to 6C, the projection lens 14 can be a rotationally asymmetric projection lens having a light emitting surface 20 on a front side of a vehicle body and a light incident surface 22 on a rear side and the focus F close to the light incident surface 22. The projection lens 14 can be secured to the holding member 18 so as to be disposed in front of the reflecting surface 12a of the reflector 12 with the focus F disposed at or near (i.e., substantially at) the second focus F2.

As shown in FIGS. 5 and 6A, the light emitting surface 20 of the projection lens 14 can be a surface designed in consideration of aesthetic feature (outer appearance or so) and, for example, being a free curved surface convex forward (neither flat nor spherical). Furthermore, the left side front end is positioned forward of the left side front end (or vice versa depending on the position in the vehicle body) so that the light emitting surface 20 is inclined with respect to the optical axis $AX_1$ of the projector lens 14. The light emitting surface 20 can also be designed in consideration of aesthetic feature (outer appearance) while being a rectangular shape as a front view (see FIG. 6C).

Figure 10:
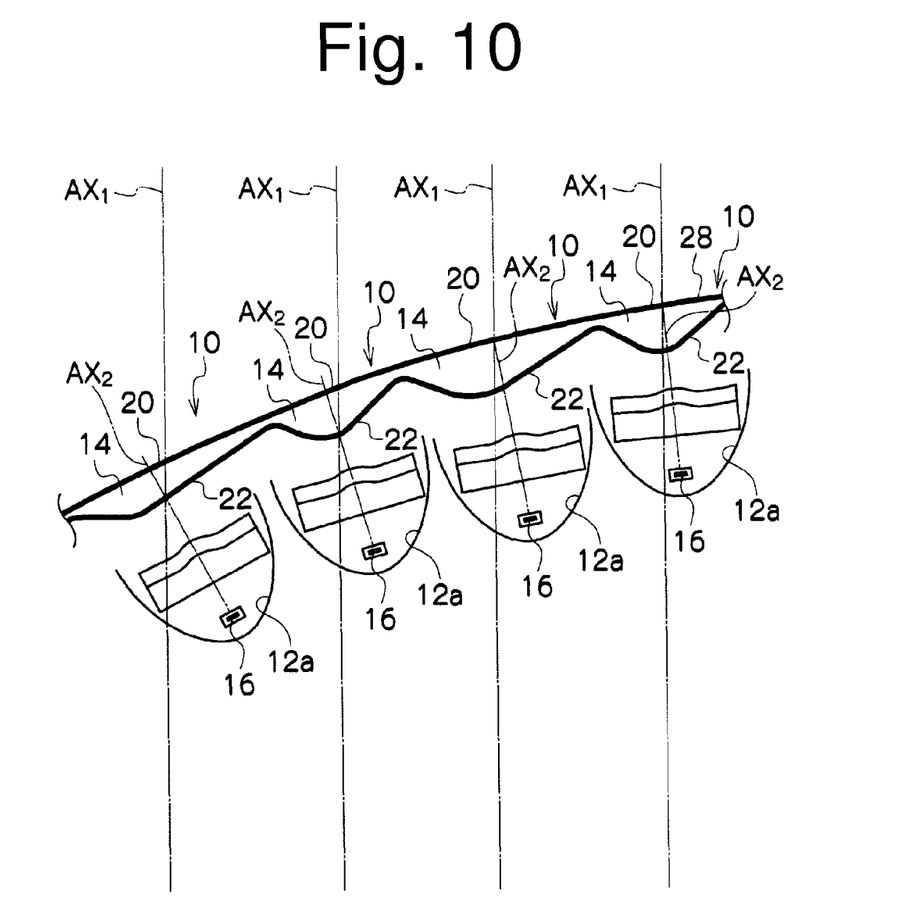
FIG. 10 is a top plan view of a modification of the vehicle headlamp.

The inclination angle of the light emitting surface 20 can be appropriately varied depending on the desired design like those shown in FIG. 10. The surface shape of the light emitting surface 20 is not limited to the convex free curved surface and can also be appropriately varied depending on the desired design. The outer shape of the light emitting surface 20 is not limited to the rectangular front shape and can also be appropriately shaped depending on the desired design.

As shown in FIGS. 6A and 6C, the light incident surface 22 of the projection lens 14 can be configured to be a surface in which, when a plurality of light beams Ray in parallel to the optical axis $AX_1$ of the projection lens 14 is incident on the light emitting surface 22 to enter thereinside, the plurality of light beams Ray exiting through the light incident surface 22 can be focused at one point (namely, the focus F of the projection lens 14). For example, the light incident surface 22 can be a free curved surface convex toward the light source 16 as viewed in its horizontal cross section and vertical cross section.

As shown in FIGS. 4 and 5, The light source 16 can emit light that is reflected by the reflecting surface 12a forward and close to the optical axis $AX_1$ of the projection lens 14 and incident on the light incident surface 22 to enter the projection lens 14, and projected forward through the light emitting surface 20. The light source 16 can be disposed at or near (i.e., substantially at) the first focus F1 of the reflecting surface 12.

The light source 16 can be a semiconductor light emitting device such as an LED, and, for example, can include four light emitting diodes having a light emission surface with 1 mm side and arranged in line at predetermined intervals on a ceramic or metal substrate 24 (see FIG. 2), thereby configuring an elongated rectangular light emission surface 16a.

The light source 16 (semiconductor light emitting device) can have a structure including a blue LED chip (or laser diode) and a covering yellow wavelength converting material (for example, YAG phosphor) in combination or a structure including three RGB LED chips (or laser diode) in combination, or other structures. The number of light sources 16 can be one or more. The semiconductor light emitting device may be a laser diode (LD).

As shown in FIGS. 3 and 4, the light source 16 (semiconductor light emitting device) can be disposed while the elongated rectangular light emission surface 16a faces upward. The longer side of the elongated rectangular light emission surface 16a is (substantially) orthogonal to the optical axis $AX_2$ of the reflecting surface 12a. The substrate 24 of the light source 16 can be secured to the holding member 18 while the elongated rectangular light emission surface 16a and the focus F of the projection lens 14 are coincident with each other, whereby the elongated rectangular light emission surface 16a is arranged near the optical axis $AX_1$ of the projection lens 14.

The reflecting surface 12a can be configured to cover the space above the light source 16 so as to receive the light emitted upward from the light source (the elongated rectangular light emission surface 16a). Note that the coverage range may not include the front space where the light reflected by the reflecting surface 12a can pass. (See FIGS. 2 and 4.)

The holding member 18 can include a mirror surface 26 extending from the focus F of the projection lens 14 toward the light source 16 and serving as a light-shielding member. The mirror surface 26 can have a front edge 26a not being linear but curved in view of the formation of the clear cut-off line for a low-beam light distribution pattern. For example, the mirror surface 26 can be configured to have the front edge 26a shaped while matching a sagittal focus group, so that the front edge 26a is positioned along the sagittal focus group.

Herein, the sagittal focus group means a focus group that is, when a plurality of virtual horizontal light beams from a predetermined light distribution pattern (in the present embodiment, a low-beam light distribution pattern) and included in a plurality of vertical surfaces having different inclination angles relative to the optical axis $AX_1$ of the projection lens 14 reach the light emitting surface 22 to enter thereinside, formed on a horizontal plane including the optical axis $AX_1$ of the projection lens 14 by focusing the plurality of virtual horizontal light beams exiting through the light incident surface 22. (See, for example, Japanese Patent Application Laid-Open No. 2009-277368.)

The light emitted from the light source 16 and incident on the mirror surface 26 can be reflected upward by the mirror surface 26 and refracted by the projection lens 14 to be projected below the cut-off line. Namely, the light originally reflected upward can be turned thereby with the front edge 26a (forming the cut-off line) as a border. This can form a clearer cut-off line in a low beam light distribution pattern.

Figure 7:
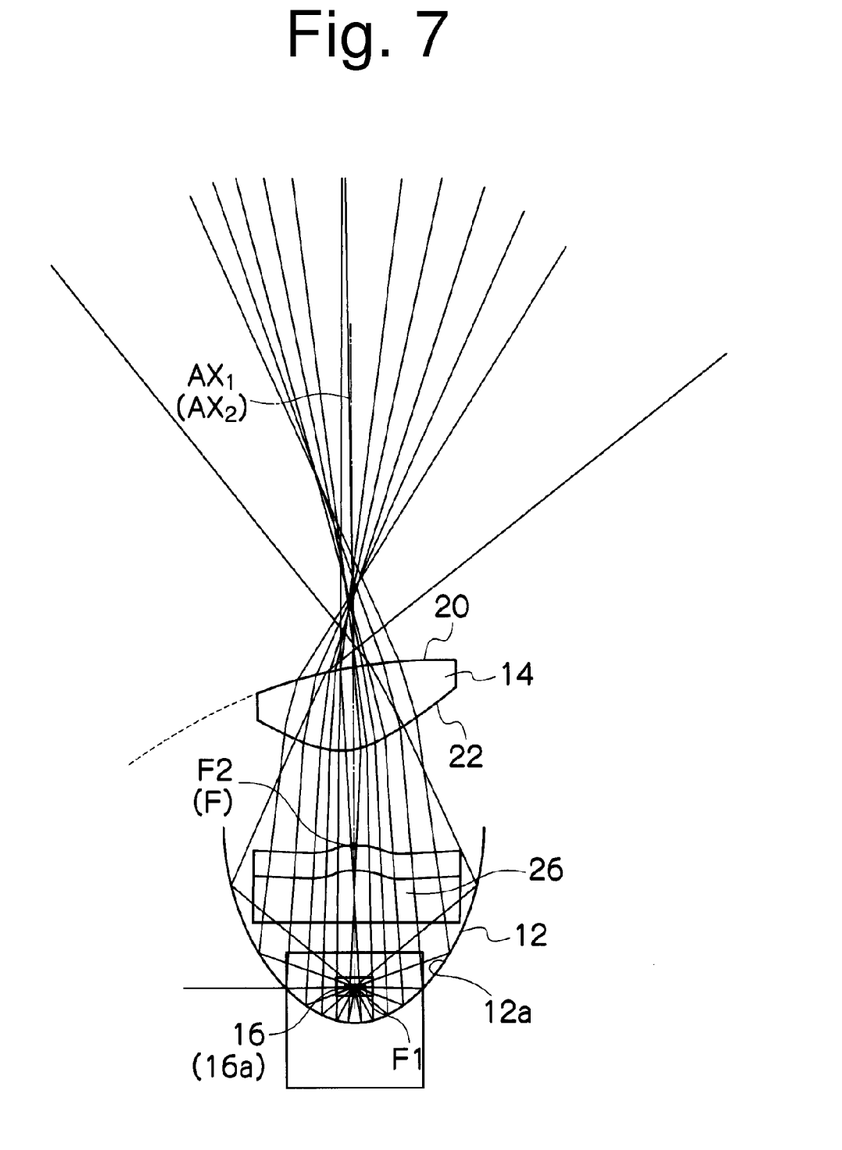
FIG. 7 is a top plan view of the vehicle headlight illustrating how the light beams are reflected by the reflector of which optical axis is coincident with the optical axis of the projection lens.

FIG. 7 is a top plan view of the vehicle headlight 10 illustrating how the light beams are reflected by the reflector 12 of which optical axis $AX_2$ is coincident with the optical axis $AX_1$ of the projection lens 14 when viewed through the reflector 12.

As described above, the vehicle headlight 10 according to the present embodiment can include the rotationally asymmetric projection lens 14 with the light emitting surface 20 of the projection lens 14 inclined with respect to the optical axis $AX_1$ of the projection lens 14 (inclined such that the right side front end is positioned forward of the left side front end).

In this case, in a comparative example as shown in FIG. 7, if the optical axis $AX_2$ of the reflecting surface 12a is made coincide with the optical axis $AX_1$ of the projection lens 14, the light emitted from the light source 16 and projected forward through the light emitting surface 20 may be diffused locally sideward (leftward or rightward) with respect to the optical axis $AX_1$ of the projection lens 14.

In order to prevent this situation, the optical axis $AX_2$ of the reflecting surface 12a is made inclined with respect to the optical axis $AX_1$ of the projection lens 14 by a predetermined angle (within a horizontal plane, for example) such that the light emitted from the light source 16 and projected forward through the light emitting surface 20 can be diffused uniformly in the right and left directions with respect to the optical axis $AX_1$ of the projection lens 14, as shown in FIG. 5.

The degree of inclination of the optical axis $AX_2$ of the reflecting surface 12a can be determined depending on the degree of inclination with respect to the optical axis $AX_1$ of the projection lens 14 such that the light emitted from the light source 16 and projected forward through the light emitting surface 20 can be diffused uniformly in the right and left directions with respect to the optical axis $AX_1$ of the projection lens 14. This may be difficult to specifically determine the angle range.

However, for example, the inclination angle of the optical axis $AX_2$ of the reflecting surface 12a can be determined by gradually varying the optical axis $AX_2$ of the reflecting surface 12a with respect to the optical axis $AX_1$ of the projection lens 14 while performing locus tracing for light beams, so that the appropriate inclination angle can be found to achieve the uniformity in diffusion of light beams with respect to the optical axis $AX_1$ of the projection lens 14.

In an alternative mode, part of the shape of the reflecting surface 12a can be adjusted so that the light emitted from the light source 16 and projected forward through the light emitting surface 20 can be diffused more uniformly in the right and left directions with respect to the optical axis $AX_1$ of the projection lens 14. When part of the reflecting surface 12a is adjusted like this, the reflecting surface 12a can have an asymmetric shape in the horizontal direction with respect to its optical axis $AX_2$.

As described above, the vehicle headlight 10 according to the present embodiment can include the rotationally asymmetric projection lens 14 with the light emitting surface 20 of the projection lens 14 inclined with respect to the optical axis $AX_1$ of the projection lens 14 (inclined such that the right (or left) side front end is positioned forward of the left (or right) side front end). Accordingly, the light emitted from the light source 16 and projected forward through the light emitting surface 20 of the projection lens 14 can be diffused substantially uniformly with respect to the optical axis $AX_1$ of the projection lens 14 (for example, uniform substantially in the right and left directions). As discussed, this can be achieved by disposing the reflecting surface 12a while the optical axis $AX_2$ of the reflecting surface 12a is made inclined with respect to the optical axis $AX_1$ of the projection lens 14 by a predetermined angle (within a horizontal plane, for example) such that the light emitted from the light source 16 and projected forward through the light emitting surface 20 can be diffused uniformly in the right and left directions with respect to the optical axis $AX_1$ of the projection lens 14, as shown in FIG. 5.

A description will next be give of a modification.

The previous embodiment with reference to FIG. 5 has been described with the light emitting surface 20 of the projection lens 14 inclined with respect to the optical axis $AX_1$ of the projection lens 14 (inclined such that the right (or left) side front end is positioned forward of the left (or right) side front end). However, the presently disclosed subject matter is not limited thereto.

Figure 8:
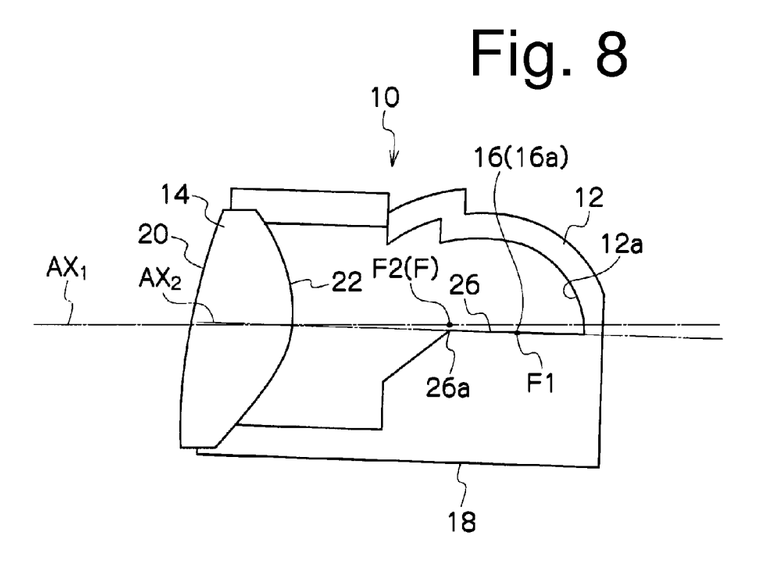
FIG. 8 is a vertical cross-sectional view of a modification of the vehicle headlamp.

FIG. 8 is a vertical cross-sectional view of a modification of the vehicle headlamp 10.

As shown in the drawing, the light emitting surface 20 of the projection lens 14 can be a surface designed in consideration of aesthetic feature (outer appearance or so) and, for example, being a free curved surface convex forward (neither flat nor spherical). Furthermore, the lower side front end is positioned forward of the upper side front end (or vice versa depending on the position in the vehicle body) so that the light emitting surface 20 is inclined with respect to the optical axis $AX_1$ of the projector lens 14.

As described above, the vehicle headlight 10 according to the present embodiment can include the rotationally asymmetric projection lens 14 with the light emitting surface 20 of the projection lens 14 inclined with respect to the optical axis $AX_1$ of the projection lens 14 (inclined such that the lower side front end is positioned forward of the upper side front end).

In this case, as shown in FIG. 7 as a similar example, if the optical axis $AX_2$ of the reflecting surface 12a is made coincide with the optical axis $AX_1$ of the projection lens 14, the light emitted from the light source 16 and projected forward through the light emitting surface 20 may be diffused locally sideward (upward or downward) with respect to the optical axis $AX_1$ of the projection lens 14. (In particular, this tendency is prominent when the vehicle headlight is configured to omit the mirror surface 26 and adjust appropriately the reflecting surface 12a so that the vehicle headlight is used as a projector-type vehicle headlight for use in forming a high-beam light distribution pattern.)

In order to prevent this situation, the optical axis $AX_2$ of the reflecting surface 12a is inclined with respect to the optical axis $AX_1$ of the projection lens 14 by a predetermined angle (within a vertical plane, for example) as shown in FIG. 8 such that the light emitted from the light source 16 and projected forward through the light emitting surface 20 can be diffused uniformly in the up and down directions with respect to the optical axis $AX_1$ of the projection lens 14.

As described above, the vehicle headlight 10 according to the present modification can include the rotationally asymmetric projection lens 14 with the light emitting surface 20 of the projection lens 14 inclined with respect to the optical axis $AX_1$ of the projection lens 14 (inclined such that the lower (or upper) side front end is positioned forward of the upper (or lower) side front end). Accordingly, the light emitted from the light source 16 and projected forward through the light emitting surface 20 of the projection lens 14 can be diffused substantially uniformly with respect to the optical axis $AX_1$ of the projection lens 14 (for example, uniform substantially in the upper and lower directions). As discussed, this can be achieved by disposing the reflecting surface 12a while the optical axis $AX_2$ of the reflecting surface 12a is made inclined with respect to the optical axis $AX_1$ of the projection lens 14 by a predetermined angle (within a vertical plane, for example) such that the light emitted from the light source 16 and projected forward through the light emitting surface 20 can be diffused uniformly in the up and down directions with respect to the optical axis $AX_1$ of the projection lens 14.

The previous embodiment has dealt with the case where a single headlight 10 is utilized, however the presently disclosed subject matter is not limited thereto.

Figure 9:
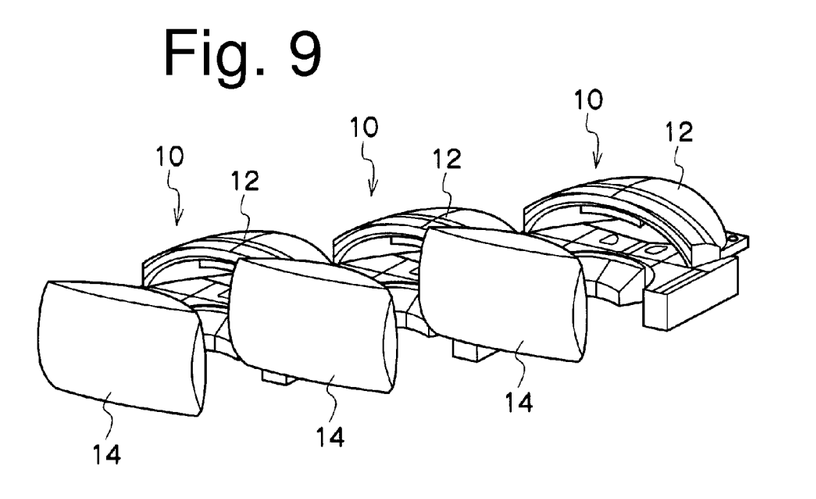
FIG. 9 is a perspective view of a modification of the vehicle headlamp.

FIG. 9 is a perspective view of a modification of the vehicle headlamp 10, and FIG. 10 is a top plan view of a modification of the vehicle headlamp 10.

In these modifications illustrated in FIGS. 9 and 10, a plurality of the vehicle headlights 10 can be used in combination.

If a plurality of the vehicle headlights 10 are combined to configure a single vehicle headlight (serving as a vehicle headlight unit), the projection lens 14 of each of the plurality of vehicle headlights 10 can be separately provided as illustrated in FIG. 9, or alternatively, the respective projection lenses 14 of the plurality of vehicle headlights 10 can be integrally provided as illustrated in FIG. 10 as a single piece of composite lens body 30 having a single common light emitting surface 28 for functioning as a light emitting surface 20 of each projection lens 14 part.

Further, the previous embodiments have been illustrated as a projector-type vehicle headlight 10 for forming a low-beam light distribution pattern. However, the presently disclosed subject matter is not limited thereto. For example, the vehicle headlight can be configured to omit the mirror surface 26 and adjust appropriately the reflecting surface 12a so that the vehicle headlight is used as a projector-type vehicle headlight for use in forming a high-beam light distribution pattern.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle headlight to be installed in a vehicle body, the vehicle headlight comprising:
a reflector having a spheroidal reflecting surface with a reflector optical axis and a first focus and a second focus through which the reflector optical axis passes, the spheroidal reflecting surface having an elliptical cross section containing the reflector optical axis and the first focus and the second focus and having an eccentricity designed to gradually increase from a vertical cross section thereof to a horizontal cross section thereof;
a rotationally asymmetric projection lens having a light emitting surface on a front side and a light incident surface on a rear side and a focus close to the light incident surface, the projection lens being disposed in front of the reflector with the focus disposed substantially at the second focus; and
a light source disposed substantially at the first focus, the light source configured to emit light that is reflected by the reflecting surface, incident on the light incident surface to enter the projection lens, and projected through the light emitting surface of the projection lens, wherein
the projection lens has an optical axis passing through the focus of the projection lens and extending in a front-to-rear direction of the vehicle headlight and being not coincident with the reflector optical axis, and the light emitting surface of the projection lens is a free curved surface being convex forward, and to have a first horizontal front end and a second horizontal front end farther from a center of the vehicle body than the first horizontal front end, the first horizontal front end being positioned forward of the second horizontal front end,
the light incident surface is a free curved surface being convex toward the light source when viewed in a horizontal cross section of the light emission surface and a vertical cross section thereof, in which, when a plurality of light beams in parallel to the optical axis of the projection lens are incident on the light emitting surface to enter thereinside, the plurality of light beams exiting through the light incident surface are focused at the focus of the projection lens,
the reflecting surface is disposed such that the reflector optical axis of the reflecting surface is inclined with respect to the optical axis of the projection lens by a predetermined angle so that light emitted from the light source and projected forward through the light emitting surface of the projection lens is made uniform with respect to the optical axis of the projection lens.

2. The vehicle headlight according to claim 1, further comprising a light-shielding member disposed between the projection lens and the light source, and configured to shield part of light that is emitted from the light source and directed through the light emitting surface of the projection lens and upward.

3. A vehicle headlight unit to be installed in a vehicle body, the vehicle headlight unit comprising a plurality of vehicle headlights, each of the vehicle headlights comprising:
a reflector having a spheroidal reflecting surface with a reflector optical axis and a first focus and a second focus through which the reflector optical axis passes, the spheroidal reflecting surface having an elliptical cross section containing the reflector optical axis and the first focus and the second focus and having an eccentricity designed to gradually increase from a vertical cross section thereof to a horizontal cross section thereof;
a rotationally asymmetric projection lens having a light emitting surface on a front side and a light incident surface on a rear side and a focus close to the light incident surface, the projection lens being disposed in front of the reflector with the focus disposed substantially at the second focus; and
a light source disposed substantially at the first focus, the light source configured to emit light that is reflected by the reflecting surface, incident on the light incident surface to enter the projection lens, and projected through the light emitting surface of the projection lens, wherein
the projection lens has an optical axis passing through the focus of the projection lens and extending in a front-to-rear direction of a respective one of the vehicle headlights and being not coincident with the reflector optical axis, and the light emitting surface of the projection lens is a free curved surface being convex forward, and to have a first horizontal front end and a second horizontal front end farther from a center of the vehicle body than the first horizontal front end, the first horizontal front end being positioned forward of the second horizontal front end,
the light incident surface is a free curved surface being convex toward the light source when viewed in a horizontal cross section of the light emission surface and a vertical cross section thereof, in which, when a plurality of light beams in parallel to the optical axis of the projection lens are incident on the light emitting surface to enter thereinside, the plurality of light beams exiting through the light incident surface are focused at the focus of the projection lens,
the reflecting surface is disposed such that the reflector optical axis of the reflecting surface is inclined with respect to the optical axis of the projection lens by a predetermined angle so that light emitted from the light source and projected forward through the light emitting surface of the projection lens is made uniform with respect to the optical axis of the projection lens.

4. The vehicle headlight unit according to claim 3, further comprising a light-shielding member disposed between the projection lens and the light source, configured to shield part of light that is emitted from the light source and directed upward through the light emitting surface of the projection lens.

5. The vehicle headlight unit according to claim 3, wherein each respective projection lens of the plurality of vehicle headlights is configured to be separately provided as a single projection lens.

6. The vehicle headlight unit according to claim 4, wherein each respective projection lens of the plurality of vehicle headlights is configured to be separately provided as a single projection lens.

7. The vehicle headlight unit according to claim 3, wherein the plurality of vehicle headlights are provided integrally, the projection lens for each of the vehicle headlights is formed integrally with other projection lenses of the vehicle headlights as a single composite projection lens to form a singular projection lens for the plurality of vehicle headlights, and the composite projection lens is formed from a single lens composed of the projection lens and the other projection lenses, each serving as the projection lens of a respective one of the vehicle headlights.

8. The vehicle headlight unit according to claim 4, wherein the plurality of vehicle headlights are provided integrally, the projection lens for each of the vehicle headlights is formed integrally with other projection lenses of the vehicle headlights as a single composite projection lens to form a singular projection lens for the plurality of vehicle headlights, and the composite projection lens is formed from a single lens composed of the projection lens and the other projection lenses, each serving as the projection lens of a respective one of the vehicle headlights.

\* \* \* \* \*